United States Patent [19]

Czumak

[11] 4,238,145

[45] Dec. 9, 1980

[54] MULTIPURPOSE FILM CASSETTE HAVING ONE-PIECE PROCESS MODE SWITCH

[75] Inventor: Frank M. Czumak, Derry, N.H.

[73] Assignee: Polaroid Corporation, Cambridge, Mass.

[21] Appl. No.: 64,132

[22] Filed: Aug. 6, 1979

[51] Int. Cl.³ ............................................. G03C 11/00
[52] U.S. Cl. ...................................... 352/130; 352/72; 352/78 R
[58] Field of Search ......................... 352/130, 72, 78 R

[56] References Cited

U.S. PATENT DOCUMENTS

| | | | |
|---|---|---|---|
| 3,778,140 | 12/1973 | Land | 352/130 |
| 3,785,725 | 1/1974 | Batter et al. | 352/78 R |
| 3,830,564 | 8/1974 | Batter | 352/130 |
| 3,832,048 | 8/1974 | Batter et al. | 352/130 |
| 3,879,116 | 4/1975 | Land | 352/130 |
| 4,003,064 | 1/1977 | Mason | 352/130 |

*Primary Examiner*—Monroe H. Hayes
*Attorney, Agent, or Firm*—Frederick A. Goettel, Jr.

[57] ABSTRACT

A multipurpose film handling cassette of the type in which a photographic film strip is exposed, processed and projected without removal of the film from the cassette is provided with a one-piece indicating element for signaling to the apparatus with which it is to be used the unprocessed or processed condition of the film within the cassette. A contact element is held, prior to processing, against a spring force into a first position wherein it will be engaged by a pair of contacts in the other apparatus when inserted therein. The element is held in this unprocessed position by a slidable element, which element is displaced responsive to film advancement following processing. Such movement of the slidable element permits the biasing force to displace the contact element to a second position wherein it will not be engaged by the contact of the other apparatus, thus signaling the presence of a processed cassette.

8 Claims, 4 Drawing Figures

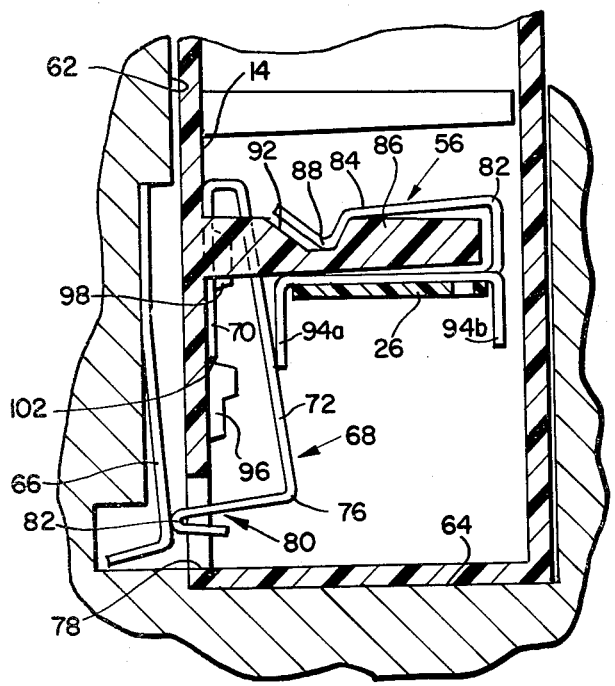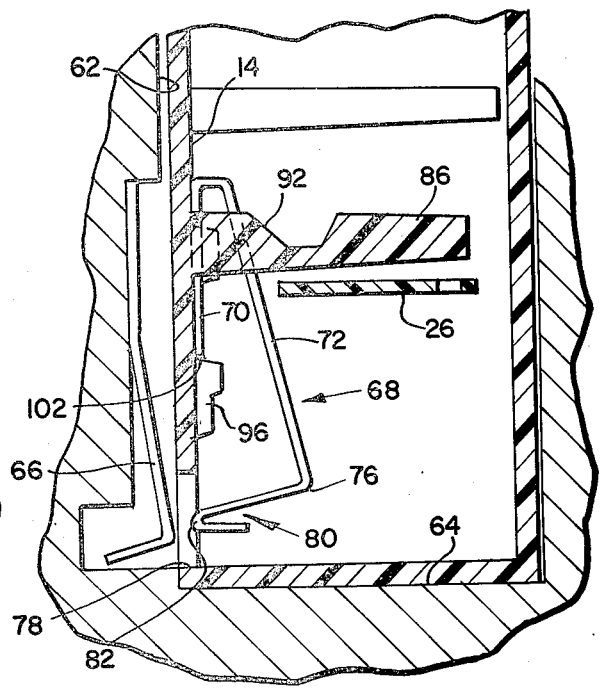
FIG. 2  FIG. 3
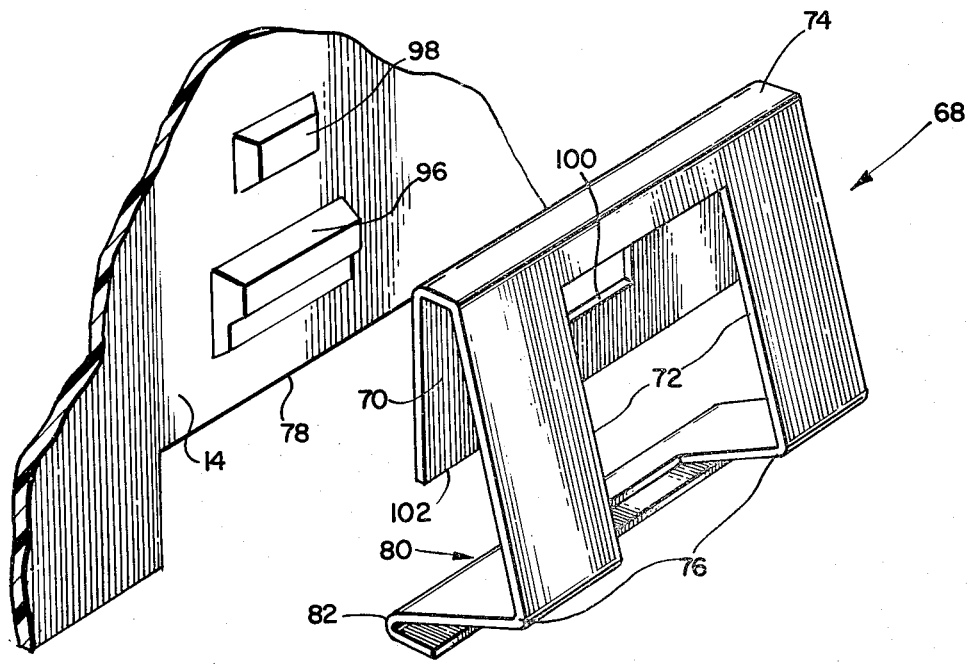
FIG. 4

MULTIPURPOSE FILM CASSETTE HAVING ONE-PIECE PROCESS MODE SWITCH

BACKGROUND OF THE INVENTION

This invention relates to multipurpose film cassettes of the type in which a photographic film strip is exposed, processed and projected without removal from the cassette and, more particularly, it concerns a novel arrangement for indicating the processed or unprocessed condition of the film strip within such a cassette.

U.S. Pat. No. 3,641,896, issued to Rogers B. Downey, et al., on Feb. 15, 1972; and U.S. Pat. Nos. 3,778,140 and 3,800,306, issued respectively on Dec. 11, 1973 and Mar. 26, 1974, to Edwin H. Land, contain exemplary disclosures of a motion picture system by which a supply of light sensitive film contained in a multipurpose cassette can be exposed in a camera adapted to receive the cassette and then processed or developed to provide the conventional series of positive transparent image frames by placing the cassette in a viewing appararatus capable of activating a processor also contained in the cassette. Thus, once the film strip has been exposed, the image sequence recorded thereon may be viewed by projection after a time interval only as long as that required to rewind the film strip, the processing operation being performed on the film during this initial rewind.

Of the many components required for satisfactory operation of such systems, the film cassette and the processor contained therein are perhaps most critical. For example, the development of transparent image frames on the light sensitive emulsion of the film strip after exposure in the camera of the system requires the deposit of processing fluid on the film strip. This is accomplished by expressing processing fluid through an orifice to a moving run of the film strip during the processing cycle. After the processing fluid is released upon initiation of the processing cycle, it must be deposited uniformly across the width of the emulsion as well as uniformly along the full useful length of the film strip with a high measure of reliability inasmuch as any non-uniformity or discontinuity in the layer of processing fluid deposited on the film strip will result in undesirable blemishes plainly observable in the images to be viewed. When the processing operation has been completed, any excess processing fluid within the cassette must be secured against leakage to the overall cassette interior. Finally, provision is made in the cassette for indicating whether the film strip has been processed or not inasmuch as the operating mode of the viewing apparatus in which the cassette is inserted after exposure is different for a cassette containing an exposed unprocessed film strip than it is for a cassette containing an exposed and processed film strip. Exemplary disclosures of such a motion picture film system having means for indicating the processed or unprocessed condition of the film strip within such a cassette are shown in the above-cited U.S. Pat. No. 3,778,140 as well as U.S. Pat. No. 3,785,725, issued to J. F. Batter, Jr., et al, on Jan. 15, 1974, and U.S. Pat. No. 4,003,064, to P. B. Mason, issued on Jan. 11, 1977.

In a typical system, the multipurpose film cassette is provided with a processed/unprocessed indicating means in the form of an internal electrical connection between two external electrical contacts which are accessible from the outside of the cassette housing. The internal electrical connection between the contacts is broken when the film is first rewound back onto the supply reel during processing. The existence of an electrical continuity between the two contacts indicates an unprocessed film, while an electrical discontinuity between the contacts indicates a processed film. The viewer/processor into which the cassette is inserted is provided with a control system which includes an operating cycle selector which is responsive to the cassette film condition indicating means to condition the control system for either a processed-film operating cycle or an unprocessed-film operating cycle.

Typically, a valve member, which is slidably mounted within the cassette and which is displaceable upon completion of processing to disable the film processing means, is used to form the internal electrical connnection mentioned above. The valve member comprises a metallic portion which is movable, responsive to film advancement in a given direction following processing, from a first position wherein it provides the desired electrical interconnection to a second position wherein the valve member serves to disable the cassette-contained processor and wherein it no longer serves to provide an electrical connection between the two contacts.

In addition to the functional importance of the cassette-contained components in the operation of the system, the cassette is preferably a package for both the supply of film and the processing fluid from the point of manufacture to use by the consumer. The cassette also serves as a permanent container for the exposed and processed film strip during storage and subsequent projection cycles. In this respect, therefore, the processing components contained in the cassette can be considered as disposable in light of their being used only once with each cassette manufactured. This aspect of the cassette adds a still further requirement; that is, that the processing components as well as other cassette components be inexpensive and capable of mass production without detracting from operational performance in effecting the processing operation. Although the cassette structure illustrated in the above-mentioned U.S. patents, as well as other patents and pending applications commonly owned by the assignee of the present invention, have evidenced significant success from the standpoint of achieving system objectives, there is a need for simplification and corresponding cost reduction in the cassette components which it is desirable to be capable of making by mass production manufacturing techniques. Further in order to reduce production costs, it is desirable to minimize the number of components in a cassette as well as to simplify the assembly process.

SUMMARY OF THE INVENTION

The invention is broadly directed to a multipurpose film handling cassette of the type in which a photographic film strip is exposed, processed and projected without removal from the cassette. The cassette includes a novel arrangement for indicating to the processor/viewer the unprocessed or processed condition of the film within the cassette.

In its illustrated embodiment, the cassette includes a parallelepiped-like housing having an opening in one side wall. A one-piece process mode switch is mounted within the housing adjacent the opening in a manner such that an elongated one-piece contact element is normally held against a natural spring biasing force of the one-piece switch to extend at least partially through the cassette housing opening so that it may be engaged by sensing contacts carried by the other apparatus when the cassette is in an unprocessed condition and is inserted into the other apparatus. The switch is held in the unprocessed condition against its inherent spring biasing force by a slidably displaceable valve also mounted within the cassette. The slidable valve is mounted above the process mode switch when the cassette is in its unprocessed condition and cooperates with cassette structure so that it engages the one-piece switch and thereby imparts the necessary downward force upon the switch to hold it in the above-described unprocessed condition. When a cassette is processed, the slidable valve is displaced from its above-described position and the spring biasing force in the one-piece contact inherently moves the one-piece contact element out of the region where it can be sensed by the process contacts of the other apparatus. Accordingly, during subsequent replays of a processed cassette, the player contacts do not engage the cassette contacts at all, thus signalling a processed film strip contained within the cassette.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been applied in the different figures to denote the same parts and wherein:

FIG. 2 is a view taken along the lines 2—2 of FIG. 1 showing an unprocessed film cassette in operative engagement within a film processing apparatus;

FIG. 3 is a view similar to FIG. 2 showing a processed cassette; and

FIG. 4 is a perspective view of a portion of a cassette in the region of the process mode indicator illustrating the manner of mounting such an indicator to a cassette side wall.

DESCRIPTION OF THE PREFERRED EMBODIMENT

Figure 1:
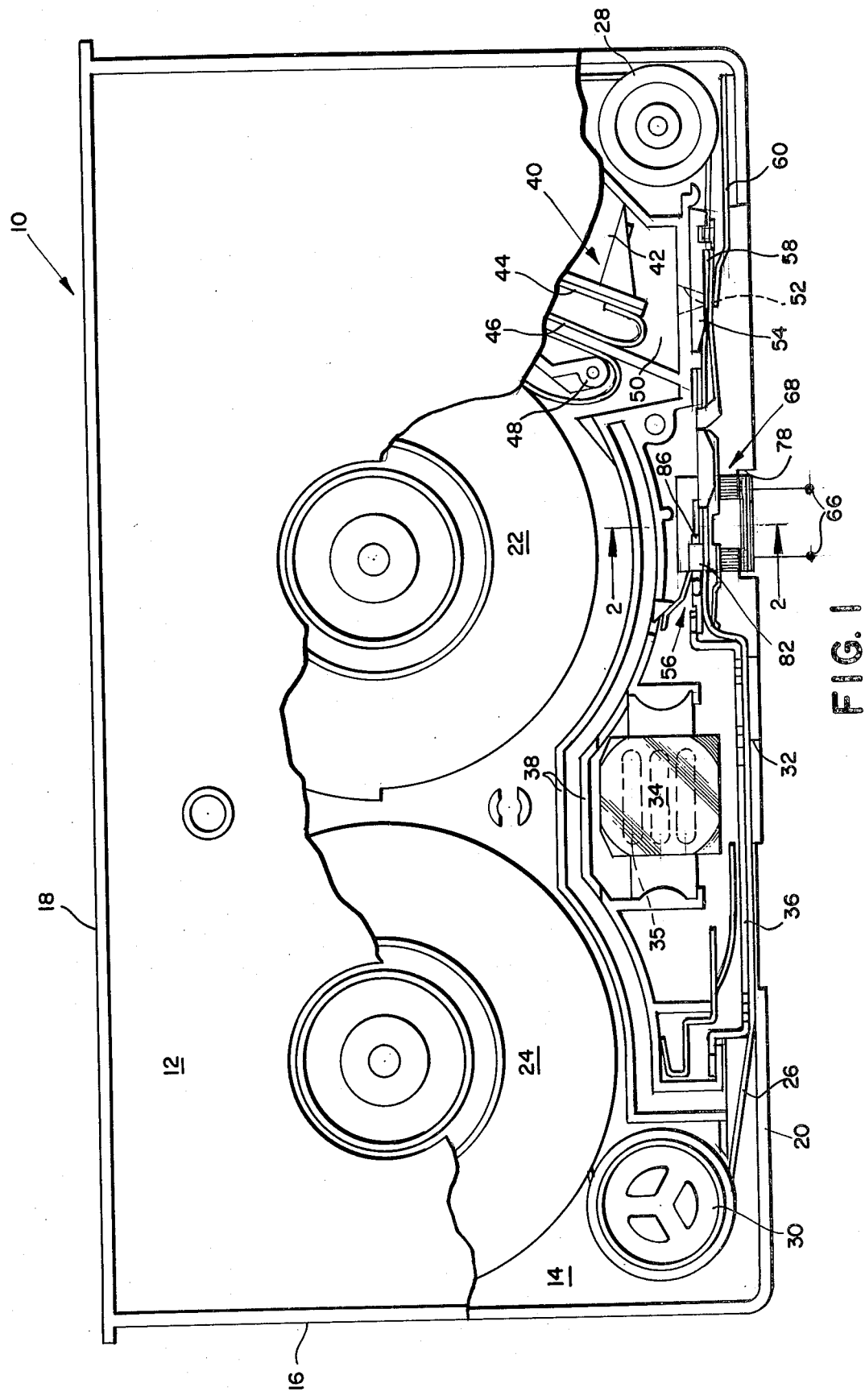
FIG. 1 is a diagrammatic view, in elevation, partially cut away to show the interior of a compact multipurpose film handling cassette embodying features of the present invention.

The multipurpose film cassette with which the present invention is particularly adapted for use is illustrated in FIG. 1 to include an outer housing 10 in the shape of a rectangular parallelepiped having front and back walls 12 and 14 respectively, end wall 16, a top wall 18 and a bottom wall 20. Mounted for rotation between the front and back walls are supply and takeup reels 22 and 24 to which supply and takeup leader ends of the film strip 26 are affixed by appropriate means. In passing from the supply reel 22 to the takeup reel 24, the film strip 26 is trained through a series of generally straight runs defined in part by an idler roller and a snubber roller 28 and 30, respectively, and a second idler roller disposed generally in the upper right hand corner of the cassette, not shown in the drawings. As shown, the film strip 26 is trained over an opening 32 in the bottom wall 20, both for exposure in an appropriate camera (not shown) and also for projection, in a viewer/processor shown only in part in FIGS. 2 and 3, by illumination passed through a reflecting prism 34 mounted in the cassette behind the opening 32 and the film strip 26 passing thereby. Situated behind the prism are air vent openings 35 in the back wall 14 to permit the circulation of air over the prism 34 for cooling and also for drying after film strip processing in the manner to be described below. A pressure plate 36 is mounted in the cassette housing behind the cassette opening 32 to support the segment of the film strip passing thereby. The air vents 35, the pressure plate 36 and the prism 34 are isolated from the supply and takeup spools 22 and 24 by a labyrinth-type light seal formed in part by internal ribs 38.

Also contained in the cassette housing 10 is a processor generally designated by the reference numeral 40 which is operative after exposure of the film strip 26 to deposit a layer of processing fluid onto the emulsion bearing side of the film strip over the entire length thereof. The processor includes a reservoir 42 in which the processing fluid is initially sealed by a tear tab closure 44 secured over a planar opening in the reservoir.

To enable release of the processing fluid from the initially sealed reservoir 42 after exposure of the film strip 26, a pull strip 46 having one end releasably secured to the tear tab closure 44 is trained about a pair of guide rollers, only one of which, 48, is shown in the drawing so that a free end (not shown) of the pull strip may be engaged by an aperture (not shown) is the supply end of the film strip 26 upon initial rewind movement thereof. The exact operation of the pull strip 46 is described fully in U.S. Pat. No. 3,895,862 to Joseph A. Stella, et al., which is assigned to the assignee of the present invention. Briefly, the free end portion of the pull strip 46 rides against the outermost convolution of the film strip contained on the supply spool 22 as the film strip is paid out from the supply spool to the takeup spool 24 during exposure of the film strip. Reversal of the film strip direction of movement during rewind, however, effects an attachment of the pull strip 46 to the supply end leader of the film strip so that the pull strip will be wound with the film onto the supply spool 22 as rewind continues. As a consequence, the tear tab closure 44 will be drawn away from the reservoir opening to release the processing fluid to a second chamber 50 in the processor 40.

The chamber 50 is located over an opening 52 in a processing fluid applicator nozzle 54 and the released processing fluid passes into the chamber and through the nozzle opening for application to the emulsion bearing side of the film strip 26. Incorporated in the processor 40 is a nozzle valve 56 which, as later explained with respect to the operation of the cassette, is utilized to close off the processor nozzle 54 and thereby disable the processor following treatment of the film strip 26 with the processing fluid. In relation to the nozzle opening 52, the valve 56 is positioned initially to the left as shown in FIG. 1 or upstream of the nozzle opening in terms of the direction of film strip travel during rewind. Additionally, a pressure pad 58 supported by a leaf spring 60 retains the film strip in operative relation to the nozzle 54 during film strip processing.

It is to be noted that the multipurpose cassette and components thereof described in the preceeding paragraphs represent a cassette structure which in itself is not novel with the present invention. It is important to a full understanding of the present invention, however, that the characteristics and operation of the cassette illustrated in FIG. 1 be understood. Specifically, following exposure of the film strip by incremental advance thereof past the opening 32 in a direction proceeding from the supply spool 22 to the takeup spool 34, rewind is initiated by driving the supply spool to rewind the film strip from the takeup spool 24 back onto the supply spool 22 as set forth above. This procedure is effected by removing the cassette from the camera in which it is exposed and placing it in a cassette-receiving well 62 provided in a processor/viewer device equipped with appropriate means for driving the supply spool 22 to rewind the film strip 26 in the manner described. During such rewinding movement, the emulsion side of the film strip will be drawn past the nozzle 52 to receive a layer of processing fluid which has been released from the reservoir 42 as a result of the tear tab closure 44 having been removed in the manner described above.

Prior to a discussion of the process mode or condition indicator of the present invention, the viewer apparatus with which the cassette is adapted to be used will be briefly described. As mentioned above, the cassette 10 is arranged for processing and projection operations within a viewer well 62 (see FIGS. 2 and 3) with its projection station opening 32 in registration with an aperture plate (not shown) provided in the bottom of the well 62. The cassette front wall is provided with an illumination aperture (not shown) located in alignment with the prism 34 and with a conventional projection lamp (not shown). During projection, the latter is configured to direct illumination into the cassette and then outwardly through incremental segments of the film 26 as such segments are progressively advanced across the opening 32. The viewer/processor is provided with suitable drive spindles (not shown) mounted alongside the well 62 for displacement into engagement with the supply and takeup reels once the cassette is properly located in the apparatus. Mounted beneath the cassette-receiving well 62 are conventional projector components (not shown) such as a claw mechanism, a rotary shutter and a projection lens assembly, the latter being configured to transmit the image bearing illumination emanating from the opening 32 and focus it in the plane of a viewing screen.

Referring now to FIGS. 2 and 3, located near the bottom 64 of the cassette receiving well 62 in position to cooperate with a cassette-contained element to be described below, are a pair of viewer process mode terminals 66, only one of which is physically shown in the referenced figures. Both process mode terminals 66 are shown schematically in FIG. 1. As set forth above, the cooperation of the cassette-contained process mode terminals 66 will signal the viewer/processor contained operating cycle selector to condition the control system for either an unprocessed-film operating cycle or a processed-film operating cycle.

Turning now to the novel process mode switch of the present invention, reference is made to FIGS. 1 and 2 wherein the switch 68 is shown mounted in a multipurpose film cassette 10 in its position wherein it will signal an unprocessed condition of the cassette-contained film. The switch 68 comprises a one-piece folded element which includes a first leg or portion 70 thereof which is adapted to be fixedly mounted to the back wall 14 of the cassette as will be subsequently described. The unitary switch 68 further comprises a pair of parallel legs 72 which emanate from a U-shaped portion 74 interconnecting the legs 72 with the portion 70 mounted to the cassette wall 14 and which are folded back upon the attaching portion and terminate in a substantially right-angled turn 76 at a location in operational registry with an opening 78 provided in the cassette back wall 14 adjacent the viewer/process mode terminals 66. Following the substantially 90° turn, the folded-over parallel legs terminate in a continuous end portion 80 which extends the full width of the switch and which comprises a conductive "shorting bar" portion 82 which is adapted to engage, under certain conditions, both of the viewer/process mode terminals 66.

The unitary process mode switch 68 is formed preferably from a stamped sheet metal material having properties such that the U-shaped bend 74 formed in the interconnection between the mounting portion 70 of the switch and the parallel legs 72 extending from the U-shaped bend form a natural inherent resiliency permitting the parallel legs and the contact or shorting bar 82 carried at their other end to be deflected towards the stationary fixed portion 70 attached to the cassette wall 14. With these characteristics in mind, reference is made to FIG. 3 wherein a cross-sectional view of a process mode switch 68 is shown in a condition which could be either prior to the installation of the above-described slide valve 56 in the cassette as will be subsequently described, or following displacement of the slide valve 56 to its position wherein it serves to disable the cassette-contained processor 40 following processing, as was described hereinabove.

Accordingly, looking at the cassette only in FIG. 3 as representing a cassette prior to installation of the slide valve 56, it will be seen that the shorting bar or contact portion 82 of the process mode switch 68 lies completely within the coextensive boundaries of the cassette housing 10 at this time with no part of it extending through the aperture 78 contained in the cassette back wall 14. This represents the natural unbiased position of the process mode switch 68.

Looking now at FIG. 2, it will be seen that the displacement nozzle valve 56 is shown installed within the cassette and comprises in part a substantially inverted U-shaped sheet metal section 84 which is adapted to slidably engage a structural portion 86 of the interior of the cassette adjacent the processs mode switch 68. The exact configuration of this processor disabling valve 56 will not be described in detail; however, the valve as depicted in the drawing figures of the present application is described in great detail in U.S. Pat. No. 4,106,042 entitled "Multipurpose Film Cassette Having A Processor Disabling Valve Retention Arrangement" of Frank M. Czumak, et al., and assigned to the assignee of the present invention, which patent is herein incorporated by reference.

The important function of the slide valve 56 herein will be appreciated with reference to FIG. 2 wherein the valve is installed in the cassette. It will be seen that the inside leg 88 of the U-shaped element 84 is formed to provide an inwardly facing jog or offset portion 90 which is received in a mating groove 92 provided in the upstanding structural portion 86 of the cassette upon which the U-shaped portion of the slide valve 56 is mounted. It should be appreciated that the slide valve in its position as depicted in FIG. 2 is mounted such that it may be slidably displaced in the direction of the travel of the film strip 26 as a result of engagement thereby by the film strip upon termination of the processing operation.

With this in mind it will be seen, again with reference to FIG. 2, that the slide valve 56 comprises a pair of structural side cams 94a,b which upon displacement of the slide valve will serve to displace the pressure pad 58 away from engagement with the film strip 26 to permit unrestricted travel of the film through the processor region during projection and rewind cycles following the processing mode. The lowermost of these cams 94a is adapted to engage the uppermost surface of the two parallel legs 72 of the process mode switch. As a result, with reference again to FIG. 2, with the slide valve installed, this lowermost cam 94a pushes the two parallel legs 72 and the shorting bar 82 carried at their ends through the opening 78 provided in the back wall 14 of the cassette housing, thereby urging the shorting bar into a position wherein it will establish electrical continuity between the viewer/process mode terminals 66. Accordingly, when the slide valve 56 is in its installed position and the cassette 10 is operatively received within the viewer cassette well 62, the slide valve is able to impose the necessary downward force to deflect the process mode switch 68 into the position shown in FIG. 2. The ability to impart the above-described downward force is derived as a result of the above-described engagement of the offset portion 90 of the slide valve with the mating groove 92 in the valve mounting structure 86. Such an arrangement, it should be appreciated, permits the slide valve 56 to impose the necessary downward force to hold the process mode switch 68 in the unprocessed cassette condition depicted in FIG. 2 while not substantially restraining the ability of the slide valve to be slidably displaced to its processor disabling condition upon termination of processing.

It will be further appreciated that displacement of the slide valve 56 to its final position following processing will result in the slide valve cam 84a no longer contacting the process mode switch 68 and, accordingly, the switch, as a result of its inherent resiliency, will return to the position depicted in FIG. 3 wherein the shorting bar or contact portion 82 no longer engages the viewer/process mode terminals 66. Accordingly, during subsequent insertions of such a cassette in a viewer, no contact will be established between the process mode terminals 66, thus signalling the control system of the viewer that a processed cassette has been inserted and the viewer will be operated in a project mode only, not in the specially conditioned rewind mode of operation which is necessary in order to process an unprocessed cassette.

With reference to FIG. 4, it will be seen that the one-piece unitary process mode switch 68 is mounted and positioned in the desired position in the back wall 14 of the cassette by a first positioning upstanding lug 96 integrally formed in the wall and a second attaching portion 98 provided in the cassette wall which is adapted to be received in a mating opening 100 provided in the mounting portion 70 of the process mode switch 68. Accordingly, attachment of the process mode switch 68 in the cassette is accomplished by positioning the mounting portion 70 with its elongated edge 102 against the positioning lug 96 and with the other upstanding portion 98 extending through the rectangular opening 100 provided in the mounting portion 70. The upstanding portion 98, extending through the opening, is then suitably deformed as, for example, by a heat staking operation to expand the upper portion extending through the hole such that it overlaps the upper portion of the attaching plate and thereby positively retains the switch 68 in the desired location.

Accordingly, it should be appreciated that a simple one-piece process mode switch has been provided for a multipurpose film handling cassette. The switch comprises a unitary element which may be readily manufactured by mass production manufacturing techniques and which may be installed within such a cassette in a simple one-step operation with little possibility of being improperly installed, i.e., for example upside down or reversed left-to-right. Further, as a result of its structure wherein it is naturally biased to a position wherein it need perform no function, the reliability of the device is maximized as it is only necessary for the device to function as a positive contact process mode switch shorting bar up until the termination of the processing of the cassette. Following that, the absence of the shorting bar results in an open circuit between the viewer-contained process mode switches 66, such open circuit being all that is relied upon to signal the presence of a processed cassette in the viewer.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A photographic film cassette for use with other apparatus, said cassette configured for depositing a coating of processing fluid on a moving run of a cassette-retained photographic film strip to develop images thereon, said cassette comprising:

a cassette housing;

means responsive to a drive arrangement of the other apparatus for advancing the film along a given path within said housing;

means actuatable in accordance with a predetermined processing operation of said cassette for depositing processing fluid on the advancing film strip;

means for indicating to the other apparatus the processed or unprocessed condition of the film strip, said indicating means comprising an indicating element mounted for displacement from a first position wherein said indicating element does not engage a signal generating arrangement carried by the other apparatus, thereby indicating a given process condition of the film, to a second position wherein said indicating means operatively engages said signal generating arrangement, thereby indicating another process condition of the film in the cassette, and means for biasing said element towards its said first position; and selectively operable means for engaging said indicating means and displacing said indicating element against said biasing force into said indicating element's second position, said engaging and displacing means comprising a member slidably mounted within said cassette for movement, responsive to said predetermined processing operation, from a first position wherein it maintains said indicating element in said indicating element's said second position to a second position wherein it does not engage said indicating means thereby allowing said biasing means to displace said indicating element to its said first position.

2. The apparatus of claim 1 wherein said indicating element comprises an electrically conductive element configured to engage a pair of electrical contacts carried by the other apparatus.

3. The apparatus of claim 1 wherein said cassette housing is provided with an opening therein adjacent said indicating element and wherein said indicating element lies completely within the coextensive boundaries of said cassette housing when said indicating element is in its said first position and wherein said indicating element extends at least in part through said opening to a position at or beyond the coextensive boundaries of said cassette housing when in its said second position.

4. The apparatus of claim 2 wherein said biasing means and said conductive element are integrally formed as a folded conductive member having one end providing a spring biasing force for displacing the other end toward its said second position to engage said pair of electrical contacts.

5. The apparatus of claim 4 wherein said cassette housing is provided with an opening therein adjacent said indicating element and wherein said other end of said folded conductive member lies completely within the coextensive boundaries of said cassette housing when said indicating element is in its said first position and wherein said indicating element and wherein said other end of said folded conductive member extends at least in part through said opening to a position at or beyond the coextensive boundaries of said cassette housing when said indicating element is in its said second position.

6. The apparatus of claim 5 wherein said one end of said folded conductive member comprises a first leg attached to an interior wall of said housing adjacent said opening and a second leg folded back over in overlying relationship to said first leg and terminating with said other leg of said folded conductive member in operative registration with said opening whereby said other end may be displaced to its said second position wherein it extends at least in part through said opening to a position at or beyond the coextensive boundaries of said cassette housing.

7. The apparatus of claim 6 wherein said first leg is provided with an opening therein and said interior wall of said cassette is provided with an upstanding lug adapted to be received in said opening and subsequently be deformed to a size larger than said opening to thereby rigidly affix said folded conductive member to said housing wall.

8. The apparatus of claim 1 wherein said given process condition of the film is the unprocessed condition and said another process condition of the film is a processed condition thereof.

* * * * *